United States Patent
Leather et al.

(10) Patent No.: US 7,633,506 B1
(45) Date of Patent: Dec. 15, 2009

(54) PARALLEL PIPELINE GRAPHICS SYSTEM

(75) Inventors: Mark M. Leather, Saratoga, CA (US); Eric Demers, Palo Alto, CA (US)

(73) Assignee: ATI Technologies ULC, Markham, Ontario (CA)

( * ) Notice: Subject to any disclaimer, the term of this patent is extended or adjusted under 35 U.S.C. 154(b) by 709 days.

(21) Appl. No.: 10/724,384

(22) Filed: Nov. 26, 2003

Related U.S. Application Data

(60) Provisional application No. 60/429,976, filed on Nov. 27, 2002.

(51) Int. Cl.
*G06T 1/20* (2006.01)
(52) U.S. Cl. .................... 345/506; 345/505; 345/519
(58) Field of Classification Search ............... 345/506, 345/505, 519
See application file for complete search history.

(56) References Cited

U.S. PATENT DOCUMENTS

| | | | | |
|---|---|---|---|---|
| 4,885,703 | A * | 12/1989 | Deering | 345/422 |
| 5,179,640 | A | 1/1993 | Duffy | |
| 5,550,962 | A | 8/1996 | Nakamura et al. | |
| 5,745,118 | A | 4/1998 | Alcorn et al. | |
| 5,794,016 | A | 8/1998 | Kelleher | |
| 5,818,469 | A | 10/1998 | Lawless et al. | |
| 5,905,506 | A | 5/1999 | Hamburg | |
| 5,977,997 | A * | 11/1999 | Vainsencher | 345/519 |
| 5,999,196 | A * | 12/1999 | Storm et al. | 345/506 |
| 6,118,452 | A | 9/2000 | Gannett | |
| 6,184,906 | B1 | 2/2001 | Wang et al. | |
| 6,219,062 | B1 * | 4/2001 | Matsuo et al. | 345/426 |
| 6,222,550 | B1 * | 4/2001 | Rosman et al. | 345/419 |
| 6,292,200 | B1 * | 9/2001 | Bowen et al. | 345/506 |
| 6,323,860 | B1 | 11/2001 | Zhu et al. | |
| 6,344,852 | B1 | 2/2002 | Zhu et al. | |
| 6,353,439 | B1 | 3/2002 | Lindholm et al. | |
| 6,380,935 | B1 | 4/2002 | Heeschen et al. | |
| 6,384,824 | B1 | 5/2002 | Morgan et al. | |
| 6,407,736 | B1 * | 6/2002 | Regan | 345/422 |
| 6,417,858 | B1 | 7/2002 | Bosch et al. | |

(Continued)

OTHER PUBLICATIONS

Akeley K. et al., "High-Performance Polygon Rendering", ACM Computer Graphics vol. 22 No. 4, 1988, pp. 239-246.*

(Continued)

*Primary Examiner*—Chante Harrison
*Assistant Examiner*—Michelle K Lay
(74) *Attorney, Agent, or Firm*—Vedder Price P.C.

(57) ABSTRACT

The present invention relates to a parallel pipeline graphics system. The parallel pipeline graphics system includes a back-end configured to receive primitives and combinations of primitives (i.e., geometry) and process the geometry to produce values to place in a frame buffer for rendering on screen. Unlike prior single pipeline implementation, some embodiments use two or four parallel pipelines, though other configurations having $2^n$ pipelines may be used. When geometry data is sent to the back-end, it is divided up and provided to one of the parallel pipelines. Each pipeline is a component of a raster back-end, where the display screen is divided into tiles and a defined portion of the screen is sent through a pipeline that owns that portion of the screen's tiles. In one embodiment, each pipeline comprises a scan converter, a hierarchical-Z unit, a z buffer logic, a rasterizer, a shader, and a color buffer logic.

21 Claims, 15 Drawing Sheets

U.S. PATENT DOCUMENTS

| | | | |
|---|---|---|---|
| 6,424,345 | B1 | 7/2002 | Smith et al. |
| 6,557,083 | B1 * | 4/2003 | Sperber et al. ............. 711/144 |
| 6,570,579 | B1 | 5/2003 | MacInnis et al. |
| 6,573,893 | B1 | 6/2003 | Naqvi et al. |
| 6,636,232 | B2 | 10/2003 | Larson |
| 6,650,327 | B1 | 11/2003 | Airey et al. |
| 6,650,330 | B2 | 11/2003 | Lindholm et al. |
| 6,697,063 | B1 * | 2/2004 | Zhu ............................ 345/421 |
| 6,714,203 | B1 | 3/2004 | Morgan et al. |
| 6,724,394 | B1 | 4/2004 | Zatz et al. |
| 6,731,289 | B1 | 5/2004 | Peercy et al. |
| 6,753,878 | B1 | 6/2004 | Heirich et al. |
| 6,762,763 | B1 | 7/2004 | Migdal et al. |
| 6,778,177 | B1 * | 8/2004 | Furtner ........................ 345/544 |
| 6,791,559 | B2 * | 9/2004 | Baldwin ..................... 345/557 |
| 6,801,203 | B1 | 10/2004 | Hussain |
| 6,809,732 | B2 | 10/2004 | Zatz et al. |
| 6,864,893 | B2 | 3/2005 | Zatz |
| 6,864,896 | B2 | 3/2005 | Perego |
| 6,897,871 | B1 | 5/2005 | Morein et al. |
| 6,980,209 | B1 * | 12/2005 | Donham et al. ............. 345/426 |
| 7,015,913 | B1 | 3/2006 | Lindholm et al. |
| 7,061,495 | B1 | 6/2006 | Leather |
| 7,170,515 | B1 * | 1/2007 | Zhu ............................ 345/422 |
| 2002/0145612 | A1 * | 10/2002 | Blythe et al. ................ 345/581 |
| 2003/0076320 | A1 | 4/2003 | Collodi |
| 2003/0164830 | A1 * | 9/2003 | Kent ........................... 345/505 |
| 2004/0041814 | A1 | 3/2004 | Wyatt et al. |
| 2004/0100471 | A1 | 5/2004 | Leather et al. |
| 2004/0164987 | A1 | 8/2004 | Aronson et al. |
| 2005/0068325 | A1 | 3/2005 | Lefebvre et al. |
| 2005/0200629 | A1 | 9/2005 | Morein et al. |

OTHER PUBLICATIONS

Elias, Hugo; Polygon Scan Converting; from http://freespace.virgin.net/hugo.elias/graphics/x_polysc.htm; pp. 1-7; Jul. 26, 2005.*

Breternitz, Jr., Mauricio et al.; Compilation, Architectural Support, and Evaluation of SIMD Graphics Pipeline Programs on a General-Purpose CPU; IEEE; 2003; pp. 1-11.

International Search Report for PCT Patent Application PCT/IB2004/003821 dated Mar. 22, 2005.

European Search Report from European Patent Office; European Application No. 03257464.2; dated Apr. 4, 2006.

Foley, James et al.; Computer Graphics, Principles and Practice; Addison-Wesley Pubiishing Company; 1990; pp. 873-899.

Crockett, Thomas W.; An introduction to parallel rendering; Eisevier Science B.V.; 1997; pp. 819-843.

Montrym, John S. et al.; InfiniteReality: A Real-Time Graphics System; Silicon Graphics Computer Systems; 1997; pp. 293-302.

Humphreys, Greg et al.; .WireGL: A Scalable Grpahics System for Ciusters; ACM Siggraph; 2001; pp. 129-140.

Fuchs, Henry et al.; Pixel-Planes 5: A Heterogeneous Multiprocessor Graphics System Using Processor-Enhanced Memories; Computer Graphics; vol. 23, No. 3; Jul. 1989; pp. 79-88.

* cited by examiner

PARALLEL PIPELINE GRAPHICS SYSTEM

This application claims priority to U.S. Provisional Application No. 60/429,976, filed Nov. 27, 2002.

This is a related application to a co-pending U.S. patent application entitled "DIVIDING WORK AMONG MULTIPLE GRAPHICS PIPELINES USING A SUPER-TILING TECHNIQUE", having Ser. No. 10/459,797, filed Jun. 12, 2003, having Leather et al. as the inventors, owned by the same assignee and hereby incorporated by reference in its entirety.

BACKGROUND OF THE INVENTION

1. Field of the Invention

The present invention relates computer graphics chips.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

Computer systems are often used to generate and display graphics on an output device such as a monitor. When complex and realistic graphics are desired there are often additional components, or chips, that are added to the computer system to assist it with the complex instruction processing that it must perform to render the graphics to the screen. Graphics chips may be considered as having a front-end and a back-end. The front-end typically receives graphics instructions and generates "primitives" that form the basis for the back-end's work. The back-end receives the primitives and performs the operations necessary to send the data to a frame buffer where it will eventually be rendered to the screen. As will be further described below, graphics chip back-ends are currently inadequate. Before further discussing this problem, an overview of a graphics system is provided.

Graphics System

Display images are made up of thousands of tiny dots, where each dot is one of thousands or millions of colors. These dots are known as picture elements, or "pixels". Each pixel has multiple attributes associated with it, including a color and a texture which is represented by a number value stored in the computer system. A three dimensional display image, although displayed using a two dimensional array of pixels, may in fact be created by rendering of a plurality of graphical objects. Examples of graphical objects include points, lines, polygons, and three dimensional solid objects. Points, lines, and polygons represent rendering primitives which are the basis for most rendering instructions. More complex structures, such as three dimensional objects, are formed from a combination or mesh of such primitives. To display a particular scene, the visible primitives associated with the scene are drawn individually by determining those pixels that fall within the edges of the primitive, and obtaining the attributes of the primitive that correspond to each of those pixels. The obtained attributes are used to determine the displayed color values of applicable pixels.

Sometimes, a three dimensional display image is formed from overlapping primitives or surfaces. A blending function based on an opacity value associated with each pixel of each primitive is used to blend the colors of overlapping surfaces or layers when the top surface is not completely opaque. The final displayed color of an individual pixel may thus be a blend of colors from multiple surfaces or layers.

In some cases, graphical data is rendered by executing instructions from an application that is drawing data to a display. During image rendering, three dimensional data is processed into a two dimensional image suitable for display. The three dimensional image data represents attributes such as color, opacity, texture, depth, and perspective information. The draw commands from a program drawing to the display may include, for example, X and Y coordinates for the vertices of the primitive, as well as some attribute parameters for the primitive (color and depth or "Z" data), and a drawing command. The execution of drawing commands to generate a display image is known as graphics processing.

Graphics Processing Chips

When complex graphics processing is required, such as using primitives to as a basis for rendering instructions or texturing geometric patterns, graphics chips are added to the computer system. Graphics chips are specifically designed to handle the complex and tedious instruction processing that must be used to render the graphics to the screen. Graphics chips have a front-end and a back-end. The front-end typically receives graphics instructions and generates the primitives or combination of primitives that define geometric patterns.

The primitives are then processed by the back end where they might be textured, shaded, colored, or otherwise prepared for final output. When the primitives have been fully processed by the back end, the pixels on the screen will each have a specific number value that defines a unique color attribute the pixel will have when it is drawn. This final value is sent to a frame buffer in the back-end, where the value is used at the appropriate time.

Modern graphics processing chip back-ends are equipped to handle three-dimensional data, since three-dimensional data produces more realistic results to the screen. When processing three-dimensional data, memory bandwidth becomes a limitation on performance. The progression of graphics processing back-ends has been from a 32 bit system, to a 64 bit system, and to a 128 bit system. Moving to a 256 bit system, where 512 bits may be processed in a single logic clock cycle, presents problems. In particular, the efficient organization and use of data "words" with a 256 bit wide DDR frame buffer is problematic because the granularity is too coarse. Increasing the width of the frame buffer to 256 bits requires innovations in the input and output (I/O) system used by the graphics processing back-end.

SUMMARY OF THE INVENTION

The present invention relates to a parallel array graphics system. In one embodiment, the parallel array graphics system includes a back-end configured to receive primitives and combinations of primitives (i.e., geometry) and process the geometry to produce values to place in a frame buffer for eventual rendering on a screen. In one embodiment, the graphics system includes two parallel pipelines. When data representing the geometry is presented to the back-end of the graphics chip, it is divided into data words and provided to one or both of the parallel pipelines.

In some embodiments, four parallel pipelines or other pipeline configurations having $2^n$ pipelines may be used. Each pipeline is a component of a raster back-end, where the display screen is divided into tiles and a defined portion of the screen (i.e., one or more tiles) is sent through a pipeline that owns that portion of the screen's tiles.

In one embodiment, each parallel pipeline comprises a raster back-end having a scan converter to step through the geometric patterns passed to the back-end, a "hierarchical-Z"

component to more precisely define the borders of the geometry, a "Z-buffer" for performing three-dimensional operations on the data, a rasterizer for computing texture addresses and color components for a pixel, a unified shader for combining multiple characteristics for a pixel and outputting a single value, and a color buffer logic unit for taking the incoming shader color and blending it into the frame buffer using the current frame buffer blend operations. A plurality of FIFO (First-In, First-Out) units are used to balance load among the pipelines.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention relates to a parallel pipeline graphics system. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Parallel Array Graphics System

Figure 1:
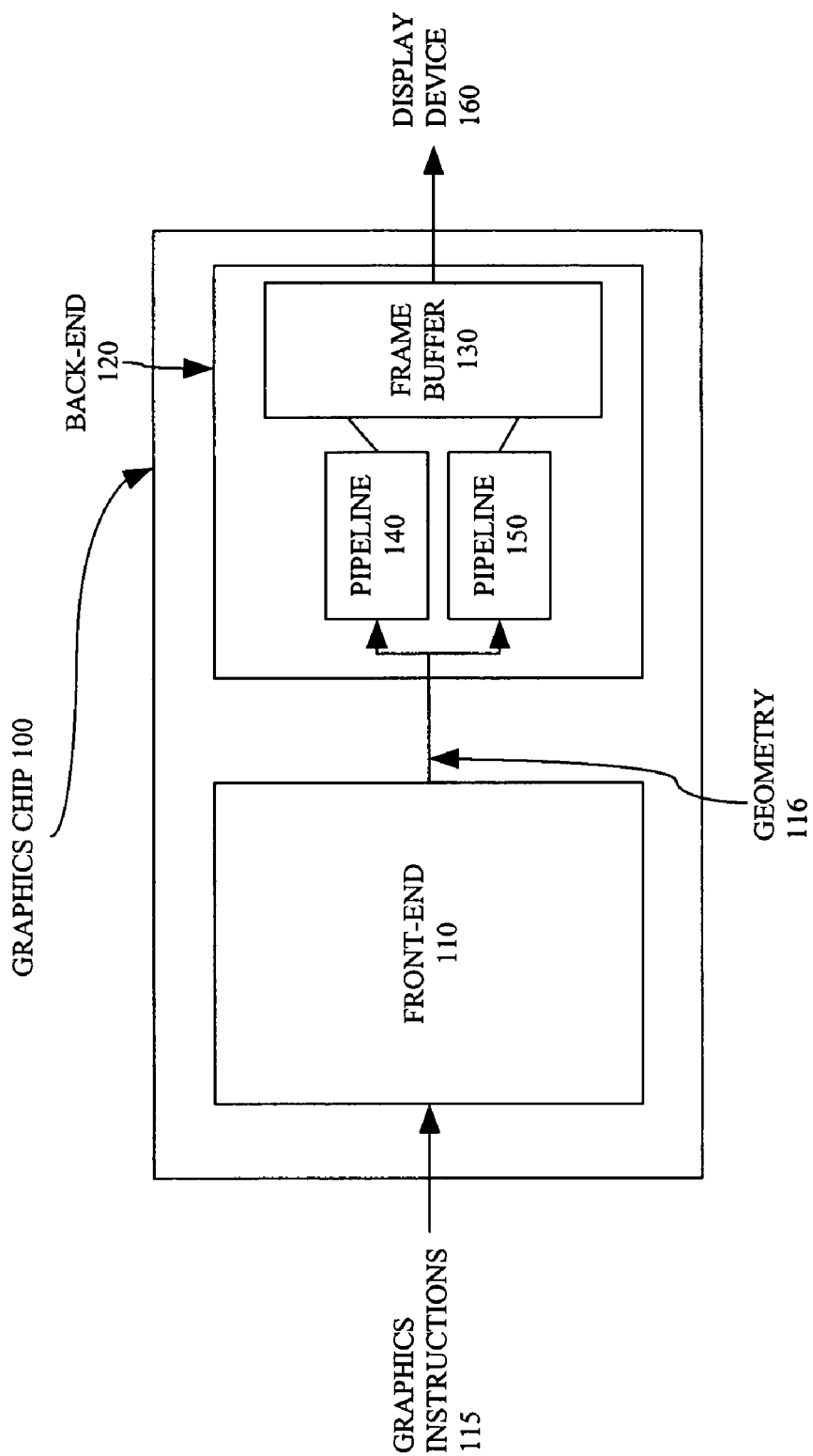
FIG. 1 is a parallel pipeline graphics system architecture according to an embodiment of the present invention.

One embodiment of the present invention is shown in the block diagram of FIG. 1. Graphics processing chip 100 comprises a front-end 110 and a back end 120. The front-end 110 receives graphics instructions 115 as input and generates geometry 116 as output. The back-end 120 is used to process the geometry 116 it receives as input. For instance, the back-end 120 might operate by texturing, shading, scanning, coloring, or otherwise preparing a pixel for final output.

When the geometry 116 has been fully processed by back-end 120, the pixels on the screen will each have a specific number value that defines a unique color attribute the pixel will have when it is drawn. The number values are passed to a frame buffer 130 where they are stored for use at the appropriate time, for instance, when they are rendered on display device 160. Back-end 120 includes two parallel pipelines, designated pipeline 140 and pipeline 150. When data representing the geometry is presented to the back-end 120 of the graphics chip, it is divided into data words and provided to one or both of the parallel pipelines 140 and 150.

Figure 2:
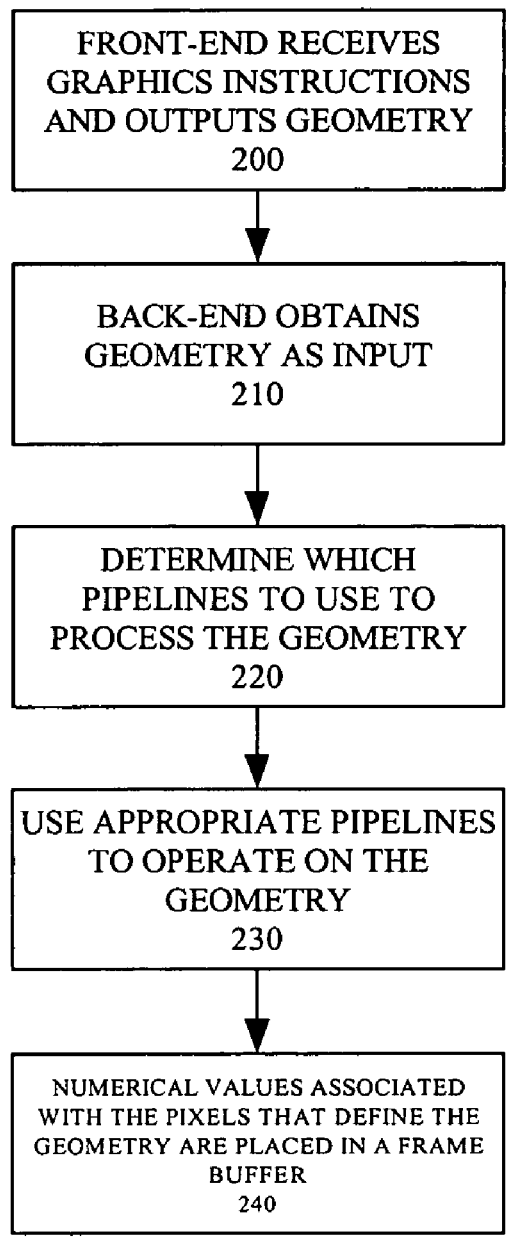
FIG. 2 is a flowchart showing the operation of a parallel pipeline graphics system according to an embodiment of the present invention.

FIG. 2 provides a flowchart showing the operation of the architecture of FIG. 1 according to an embodiment of the present invention. At step 200 a graphics chip front-end receives graphics instructions as input and generates geometry as output. At step 210, a graphics chip back-end obtains the geometry as input. Next, it is determined which pipelines to use to operate on the geometry at step 220. At step 230 the appropriate pipelines operate on the geometry, for instance, the pipelines might texture, shade, scan, color, or otherwise preparing the geometry for final output. Then, at step 240, the numerical values that are associated with the pixels that define the geometry are put into a frame buffer. The size of the frame buffer may vary.

Figure 3:
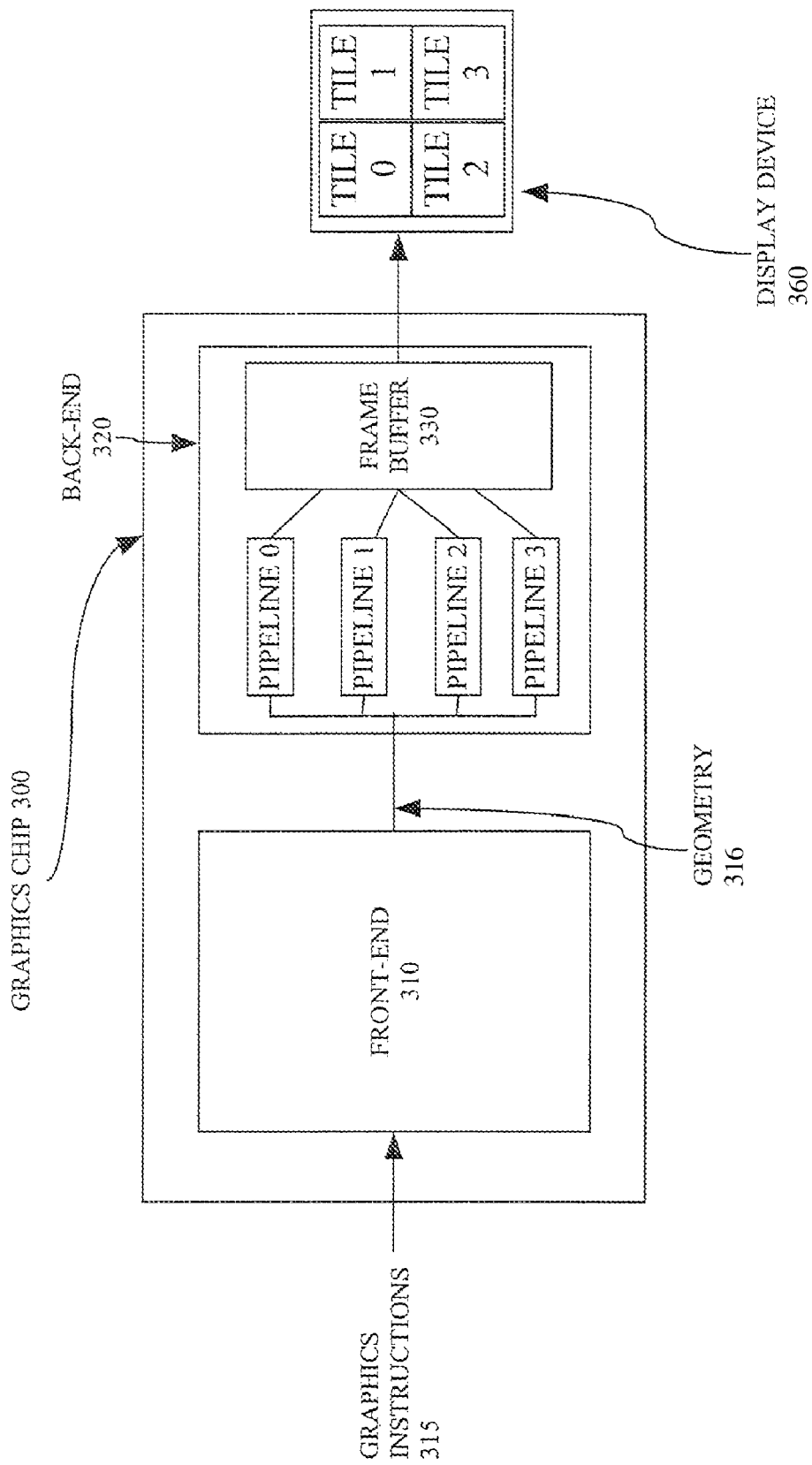
FIG. 3 is a parallel pipeline graphics system architecture according to another embodiment of the present invention.

In another embodiment, 2 or more pipelines are used and each pipeline is a component of a raster back-end. The display screen is divided into tiles and a defined portion of the screen is sent (i.e., one or more tiles) through a pipeline that owns that portion of the screen's tiles. This embodiment is shown in FIG. 3. Graphics processing chip 300 comprises a front-end 310 and a back-end 320. The front-end 310 receives graphics instructions 315 as input and generates geometry 316 as output. The back-end 320 is used to process the geometry 316 it receives as input. For instance, the back-end 320 might operate by texturing, shading, scanning, coloring, or otherwise preparing a pixel for final output.

When the geometry 316 has been fully processed by back-end 320, the pixels on the screen will each have a specific number value that defines a unique color attribute the pixel will have when it is drawn. The number values are passed to a frame buffer 330 where they are stored for use at the appropriate time, for instance, when they are rendered on display device 360. Back-end 320 includes $2^n$ parallel pipelines, designated pipeline 0 through pipeline n−1. When data representing the geometry is presented to the back-end 320 of the graphics chip 300, it is analyzed by back-end 320 to determine which geometry (or portions of geometry) fall within a given tile. For instance, if pipeline 0 owns tile 0 on display device 360, then the geometry in tile 0 is passed to pipeline 0.

Figure 4:
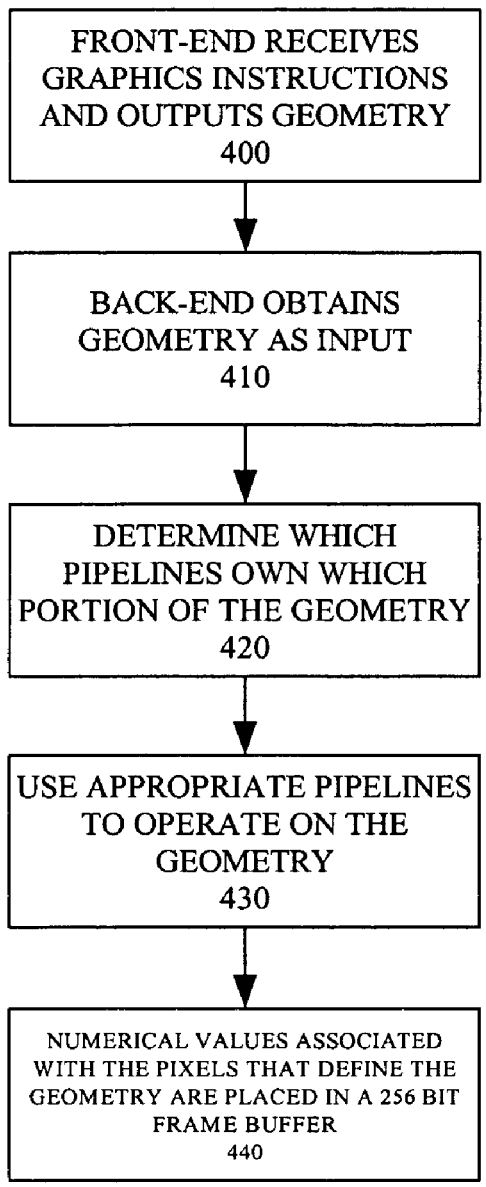
FIG. 4 is a flowchart showing the operation of a parallel pipeline graphics system according to another embodiment of the present invention.
Figure 5:
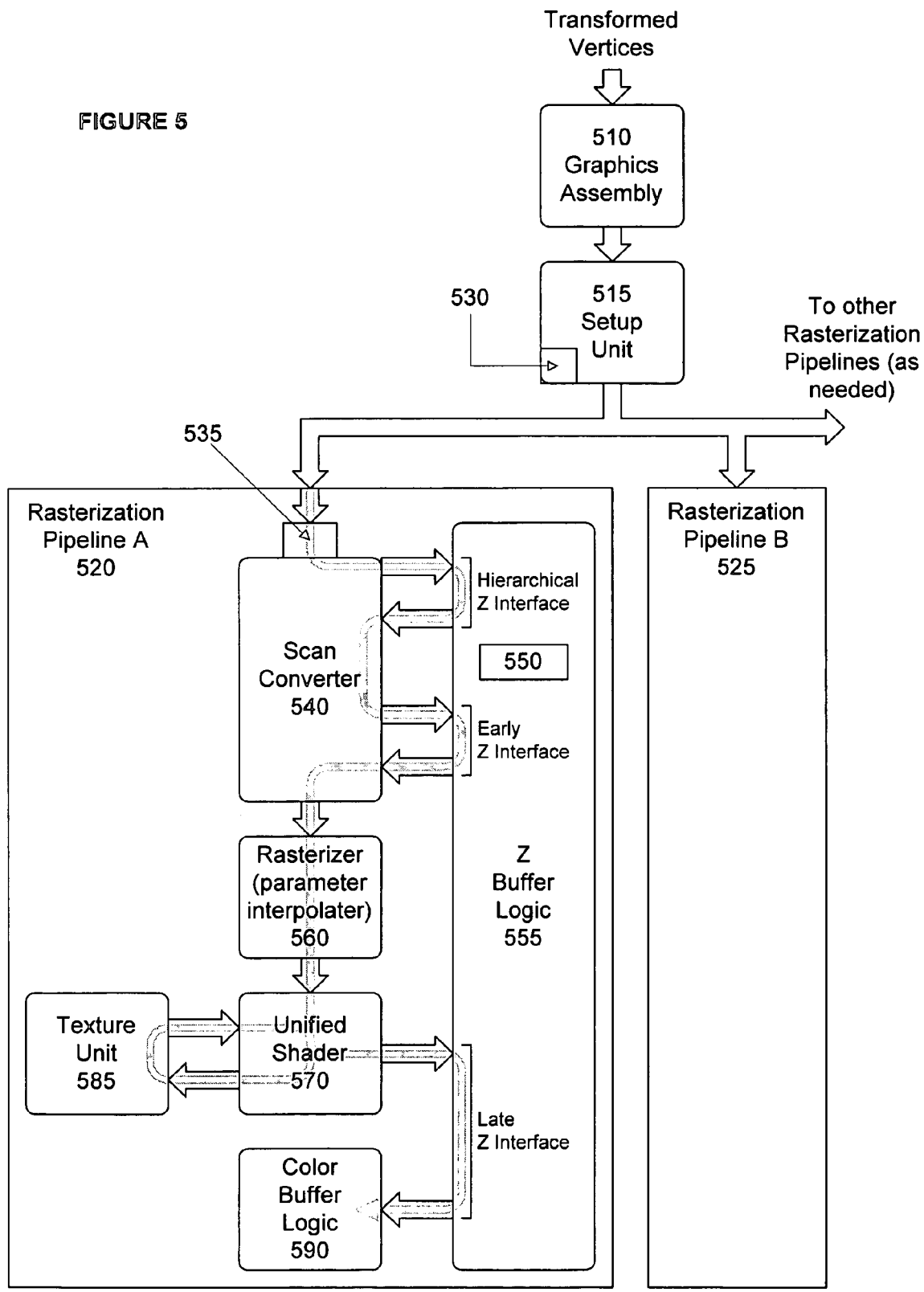
FIG. 5 is a raster back-end portion of a pipeline according to another embodiment of the present invention.

FIG. 4 provides a flowchart showing the operation of the architecture of FIG. 3 according to an embodiment of the present invention. At step 400 a graphics chip front-end receives graphics instructions as input and generates geometry as output. At step 410, a graphics chip back-end obtains the geometry as input. Next, at step 420 the back-end analyzes the geometry to determine which pipeline owns which portion of the geometry, for instance if a geometry falls within two tiles, then the geometry processing is divided among the pipelines that own those tiles. At step 430 the appropriate pipelines operate on the geometry, for instance, the pipelines might texture, shade, scan, color, or otherwise preparing the geometry for final output. Then, at step 440, the numerical values that are associated with the pixels that define the geometry are put into a frame buffer.

Embodiment of a Back-End Graphics Chip

In one embodiment, each parallel pipeline comprises a raster back-end having a scan converter to step through the geometric patterns passed to the back-end, a "hierarchical-Z" component to more precisely define the borders of the geometry, a "Z-buffer" for performing three-dimensional operations on the data, a rasterizer for computing texture addresses and color components for a pixel, a unified shader for combining multiple characteristics for a pixel and outputting a single value, and a color buffer logic unit for taking the incoming shader color and blending it into the frame buffer using the current frame buffer blend operations.

In operation, graphics assembly unit 510 takes transformed vertices data and assembles complete graphics primitives—triangles or parallelograms, for instance. A set-up unit 515 receives the data output from graphics assembly 510 and generates slope and initial value information for each of the texture address, color, or Z parameters associated with the primitive. The resulting set-up information is passed to 2 or more identical pipelines. In the current example there are two pipelines, pipeline 520 and pipeline 525, but the present invention contemplates any configuration of parallel pipelines. In this example, each pipeline 520 and 525 owns one-half of the screens pixels. Allocation of work between the pipelines is made based on a repeating square pixel, tile pattern. In one embodiment, logic 530 in the set-up unit 515 intersects the graphics primitives with the repeating tile pattern such that a primitive is only sent to a pipeline if it is likely that it will result in the generation of covered pixels. The functionality of a setup unit is further described in commonly owned co-pending U.S. patent application entitled "Scalable Rasterizer Interpolator", with Ser. No. 10/730,864, filed Dec. 8, 2003, and is hereby fully incorporated by reference.

In one embodiment of the present invention, the set-up unit manages the distribution of polygons to the pipelines. As noted above, the display is divided into multiple tiles and each pipeline is responsible for a subset of the tiles. It should be noted that any number of square or non-square tiles can be used in the present invention.

Figure 6:
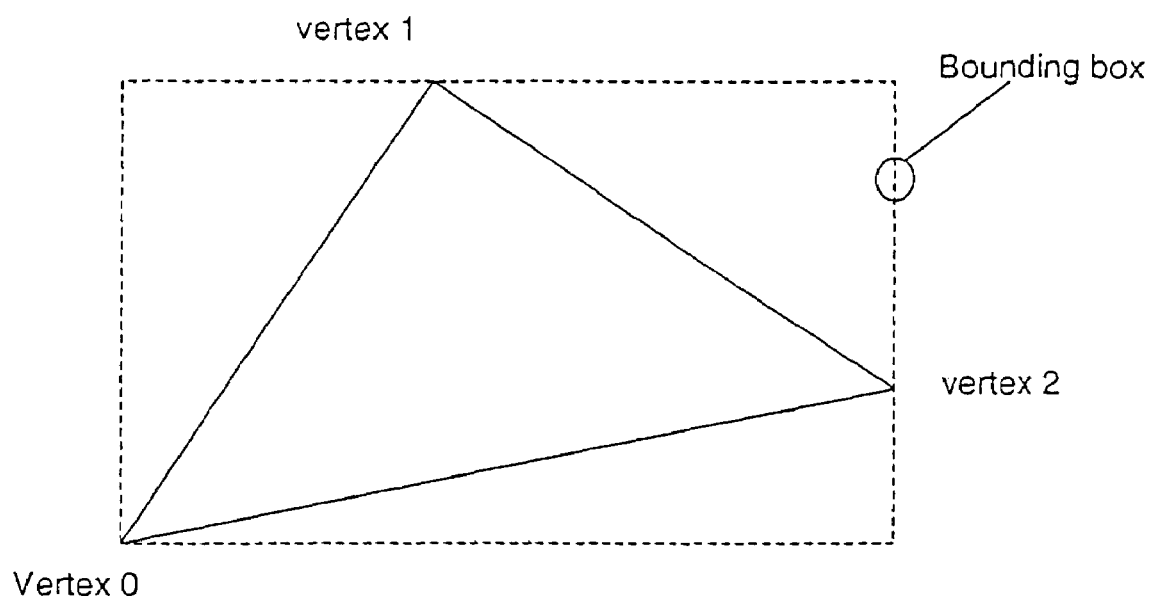
FIG. 6 is a bounding box illustrating an embodiment of the invention.

A polygon can be composed of 1, 2, or 3 vertices. Vertices are given by the graphics application currently executing on a host system. The vertices are converted from object space 3-dimensional homogeneous coordinate system to a display (screen) based coordinate system. This conversion can be done on the host processor or in a front end section of the graphics chip (i.e. vertex transformation). The screen based coordinate system has at least X and Y coordinates for each vertex. The set-up unit 515 creates a bounding box based on the screen space X, Y coordinates of each vertex as shown in FIG. 6. The bounding box is then compared against a current tile pattern. The tiling pattern is based on the number of graphics pipelines currently active. For example, in a two (A and B) pipeline system, the upper left and lower right pixel tiles of a four tile quad are assigned to pipeline A and the upper right and lower left tiles to pipeline B (or vice versa). In a single pipeline system, all tiles are assigned to pipeline A. In one embodiment, the setup unit computes initial value (at vertex 0) and slopes for each of up to 42 parameters associated with the current graphics primitive.

The bounding boxes' four corners are mapped to the tile pattern, simply by discarding the lower bits of X & Y. The four corners map to the same or different tiles. If they all map to the same tile, then only the pipeline that is associated with that tile receives the polygon. If it maps to only tiles that are associated with only one pipeline, then again only that pipeline receives the polygon. In one embodiment, if it maps to tiles that are associated with multiple pipelines, then the entire polygon is sent to all pipelines.

Each pipeline contains an input FIFO 535 used to balance the load over different pipelines. A scan converter 540 works in conjunction with Hierarchical Z interface of Z buffer logic 555 to step through the geometry (e.g., triangle or parallelogram) within the bounds of the pipeline's tile pattern. In one embodiment, initial stepping is performed at a coarse level. For each of the coarse level tiles, a minimum (i.e., closest) Z value is computed. This is compared with the farthest Z value for the tile stored in a hierarchical-Z buffer 550. If the compare fails, the tile is rejected. The functionality of the scan converter and Hierarchical Z interface is further described in commonly owned co-pending U.S. patent application entitled "Scalable Rasterizer Interpolator", with Ser. No. 10/730,864, filed Dec. 8, 2003, and is hereby fully incorporated by reference.

The second section of the scan converter 540 works in conjunction with the Early Z interface of the Z buffer logic 550 to step through the coarse tile at a fine level. In one embodiment, the coarse tile is subdivided into 2×2 regions (called "quads"). For each quad, coverage and Z (depth) information is computed. A single bit mode register specifies where Z buffering takes place. If the current Z buffering mode is set to "early", each quad is passed to the Z buffer 555 where its Z values are compared against the values stored in the Z buffer at that location. Z values for those covered pixels which "pass" the z compare, are written back into the Z buffer, and a modified coverage mask describing the result of the Z compare test is passed back to the scan converter 540. At this stage, those quads for which none of the covered pixels passed the Z compare test are discarded. The early Z functionality attempts to minimize the amount of work applied by the unified shader and texture unit to quads which are not visible. The functionality of the scan converter and Early Z interface is further described in commonly owned co-pending U.S. patent application entitled "Scalable Rasterizer Interpolator", with Ser. No. 10/730,864, filed Dec. 8, 2003, and is hereby fully incorporated by reference.

Rasterizer 560 computes up to multiple sets of 2D or 3D perspective correct texture addresses and colors for each quad. The time taken to transfer data for each quad depends on the total number of texture addresses and colors required by that quad.

A unified shader 570 works in conjunction with the texture unit 585 and applies a programmed sequence of instructions to the rasterized values. These instructions may involve simple mathematical functions (add, multiply, etc.) and may also involve requests to the texture unit. A unified shader reads in rasterized texture addresses and colors, and applies a programmed sequence of instructions. A unified shader is so named because the functions of a traditional color shader and a traditional texture address shader are combined into a single, unified shader. The unified shader performs both color shading and texture address shading. The conventional distinction between shading operations (i.e., color texture map and coordinate texture map or color shading operation and texture address operation) is not handled by the use of separate shaders. In this way, any operation, be it for color shading or texture shading, may loop back into the shader and be combined with any other operation.

The functionality of a unified shader is further described in commonly owned co-pending U.S. patent application entitled "Unified Shader", with Ser. No. 10/730,965, filed Dec. 8, 2003, and is hereby fully incorporated by reference.

The coverage and Z information generated by the scan converter 540, is passed to the Z buffer logic 555 via the Late Z interface. If the current Z buffering mode is set to "late", the Z values for the quad are compared against the values stored in the Z buffer at that location. Z values for those covered pixels which "pass" the z compare are written back into the Z buffer. A modified coverage mask describing the result of the Z compare test is passed to the color buffer 590. Although early Z operation is preferred for performance reasons, in certain situations the unified shader might modify the contents of the coverage mask (for example based on the value of the alpha channel), and in these cases the Z buffering mode will need to be set to "late".

Color buffer logic 590 takes the incoming shader color and blends it into the frame buffer using the current frame buffer blend operations. Blending only takes place for the covered sample (e.g., those with a corresponding 1 in the coverage mask).

Synchronizing Graphics Data and State

Figure 7:
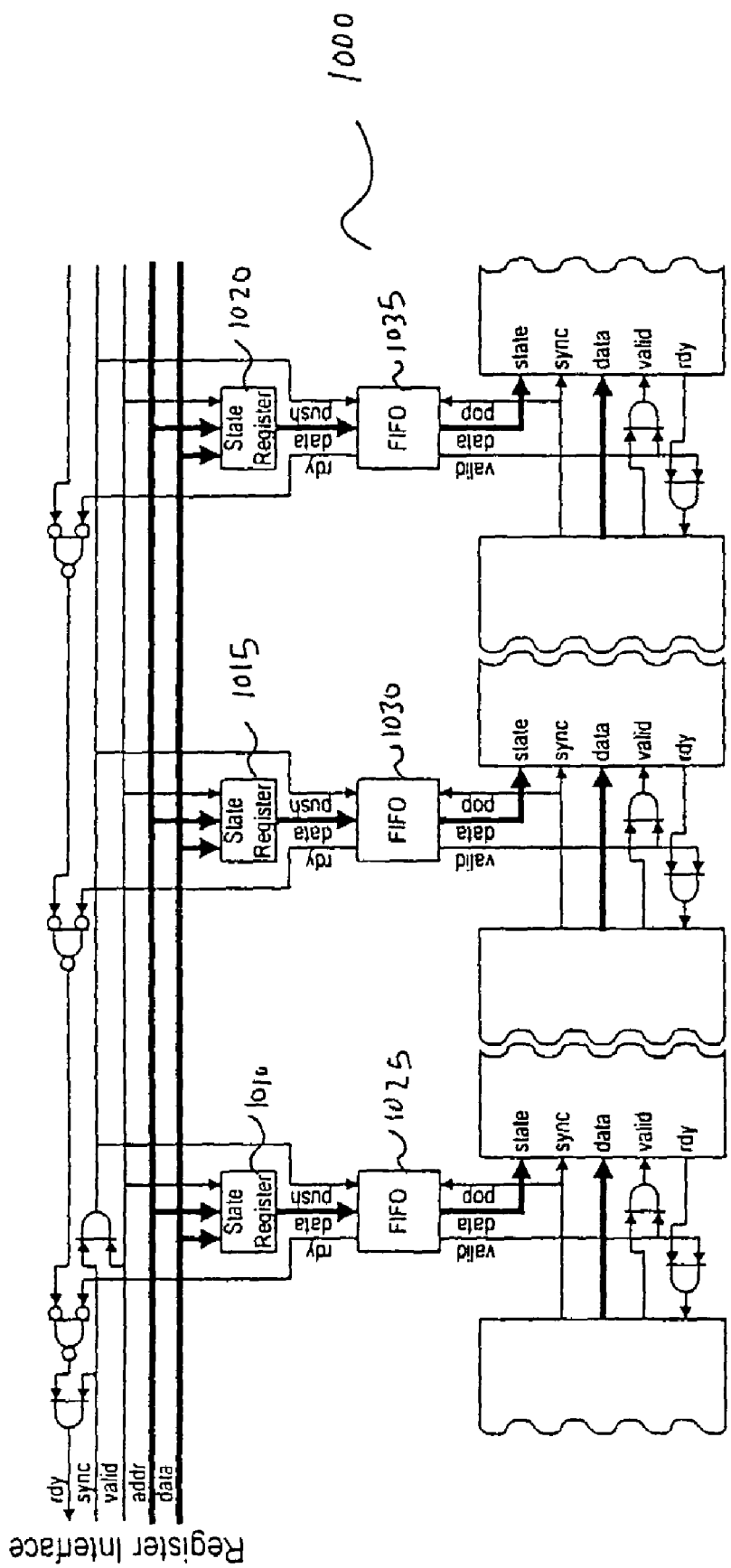
FIG. 7 shows an apparatus for synchronizing graphics data and state according to an embodiment of the present invention.

At each point in the graphics pipeline requiring state information, a state register and FIFO is added in one embodiment of the present invention. This embodiment is shown in FIG. 7 where pipeline 1000 includes state registers 1010, 1015, and 1020 and FIFOs 1025, 1030, and 1035. The state registers 1010-1020 store all the state pertaining to the current stage in the graphics pipeline. It is loaded from the register interface.

Upon receipt of a "synchronize" bit from the register interface, the entire state for the graphics stage gets written into a FIFO. If the FIFO is empty, this is then immediately available for use by the graphics stage. If the FIFO is partially full, the state gets buffered for future use. A state change is enacted by sending a "synchronize" token down the graphics pipeline. This has the effect of "pop"ing a new set of state off the FIFO. If any of the state-change FIFO's are empty, that stage will stall the previous stage, and remain in a wait state until the FIFO contains valid state data. This prevents a graphics stage from using "garbage" or "expired" state. The register interface stalls if any of the FIFO's are completely full during a cycle for which its "synchronize" bit is asserted. This prevents any of the FIFO's from overrunning and losing data.

Embodiment of Computer Execution Environment (Hardware)

Figure 8:
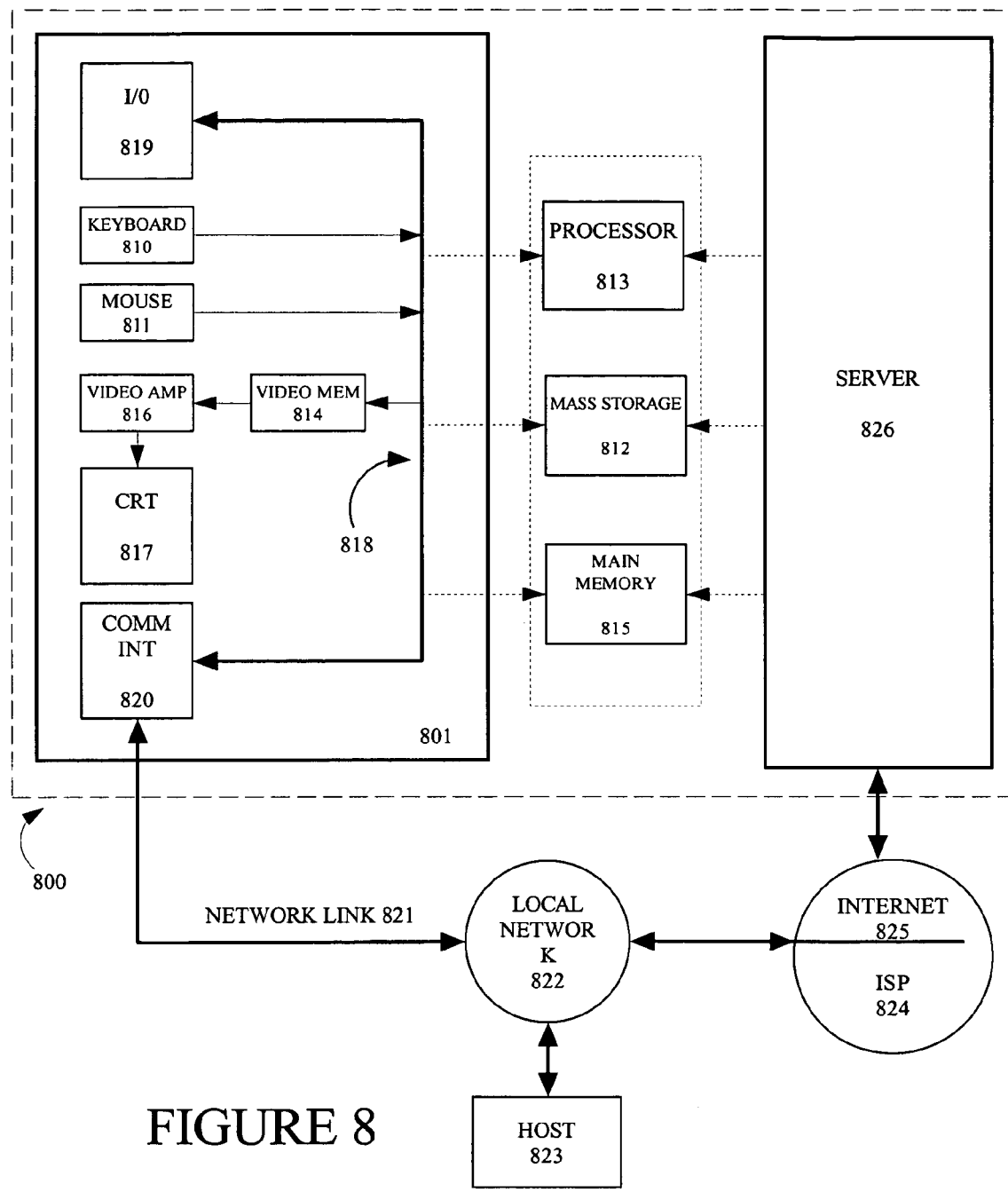
FIG. 8 is an embodiment of a computer execution environment suitable for the present invention.

An embodiment of the invention can be implemented as computer software in the form of computer readable program code executed in a general purpose computing environment such as environment 800 illustrated in FIG. 8, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 810 and mouse 811 are coupled to a system bus 818. The keyboard and mouse are for introducing user input to the computer system and communicating that user input to central processing unit (CPU) 813. Other suitable input devices may be used in addition to, or in place of, the mouse 811 and keyboard 810. I/O (input/output) unit 819 coupled to bi-directional system bus 818 represents such I/O elements as a printer, A/V (audio/video) I/O, etc.

Computer 801 may include a communication interface 820 coupled to bus 818. Communication interface 820 provides a two-way data communication coupling via a network link 821 to a local network 822. For example, if communication interface 820 is an integrated services digital network (ISDN) card or a modem, communication interface 820 provides a data communication connection to the corresponding type of telephone line, which comprises part of network link 821. If communication interface 820 is a local area network (LAN) card, communication interface 820 provides a data communication connection via network link 821 to a compatible LAN. Wireless links are also possible. In any such implementation, communication interface 820 sends and receives electrical, electromagnetic or optical signals which carry digital data streams representing various types of information.

Network link 821 typically provides data communication through one or more networks to other data devices. For example, network link 821 may provide a connection through local network 822 to host 823 or to data equipment operated by ISP 824. ISP 824 in turn provides data communication services through the world wide packet data communication network now commonly referred to as the "Internet" 825. Local network 822 and Internet 825 may use electrical, electromagnetic or optical signals which carry digital data streams. The signals through the various networks and the signals on network link 821 and through communication interface 820, which carry the digital data to and from computer 800, are exemplary forms of carrier waves transporting the information.

Processor 813 may reside wholly on client computer 801 or wholly on server 826 or processor 813 may have its computational power distributed between computer 801 and server 826. Server 826 symbolically is represented in FIG. 8 as one unit, but server 826 can also be distributed between multiple "tiers". In one embodiment, server 826 comprises a middle and back tier where application logic executes in the middle tier and persistent data is obtained in the back tier. In the case where processor 813 resides wholly on server 826, the results of the computations performed by processor 813 are transmitted to computer 801 via Internet 825, Internet Service Provider (ISP) 824, local network 822 and communication interface 820. In this way, computer 801 is able to display the results of the computation to a user in the form of output.

Computer 801 includes a video memory 814, main memory 815 and mass storage 812, all coupled to bi-directional system bus 818 along with keyboard 810, mouse 811 and processor 813. As with processor 813, in various computing environments, main memory 815 and mass storage 812, can reside wholly on server 826 or computer 801, or they may be distributed between the two. Examples of systems where processor 813, main memory 815, and mass storage 812 are distributed between computer 801 and server 826 include the thin-client computing architecture developed by Sun Microsystems, Inc., the palm pilot computing device and other personal digital assistants, Internet ready cellular phones and other Internet computing devices, and in platform independent computing environments, such as those that utilize the Java technologies also developed by Sun Microsystems, Inc.

The mass storage 812 may include both fixed and removable media, such as magnetic, optical or magnetic optical storage systems or any other available mass storage technology. Bus 818 may contain, for example, thirty-two address lines for addressing video memory 814 or main memory 815. The system bus 818 may also include, for example, a 32-bit data bus for transferring data between and among the components, such as processor 813, main memory 815, video memory 814 and mass storage 812. Alternatively, multiplex data/address lines maybe used instead of separate data and address lines.

In one embodiment of the invention, the processor 813 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. Main memory 815 may be comprised of dynamic random access memory (DRAM). Video memory 814 may be a dual-ported video random access memory. One port of the video memory 814 may be coupled to video amplifier 816. The video amplifier 816 maybe used to drive a display/output device 817, such as a cathode ray tube (CRT) raster monitor. Video amplifier 816 is well known in the art and may be implemented by any suitable apparatus. This circuitry converts pixel data stored in video memory 814 to a raster signal suitable for use by display/output device 817. Display/output device 817 maybe any type of monitor suitable for displaying graphic images.

Computer 801 can send messages and receive data, including program code, through the network(s), network link 821, and communication interface 820. In the Internet example, remote server computer 826 might transmit a requested code for an application program through Internet 825, ISP 824, local network 822 and communication interface 820. The received code may be executed by processor 813 as it is received, and/or stored in mass storage 812, or other non-volatile storage for later execution. In this manner, computer 800 may obtain application code in the form of a carrier wave. Alternatively, remote server computer 826 may execute applications using processor 813, and utilize mass storage 812, and/or video memory 815. The results of the execution at server 826 are then transmitted through Internet 825, ISP 824, local network 822 and communication interface 820. In this example, computer 801 performs only input and output functions.

In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Unified Shader

Figure 9:
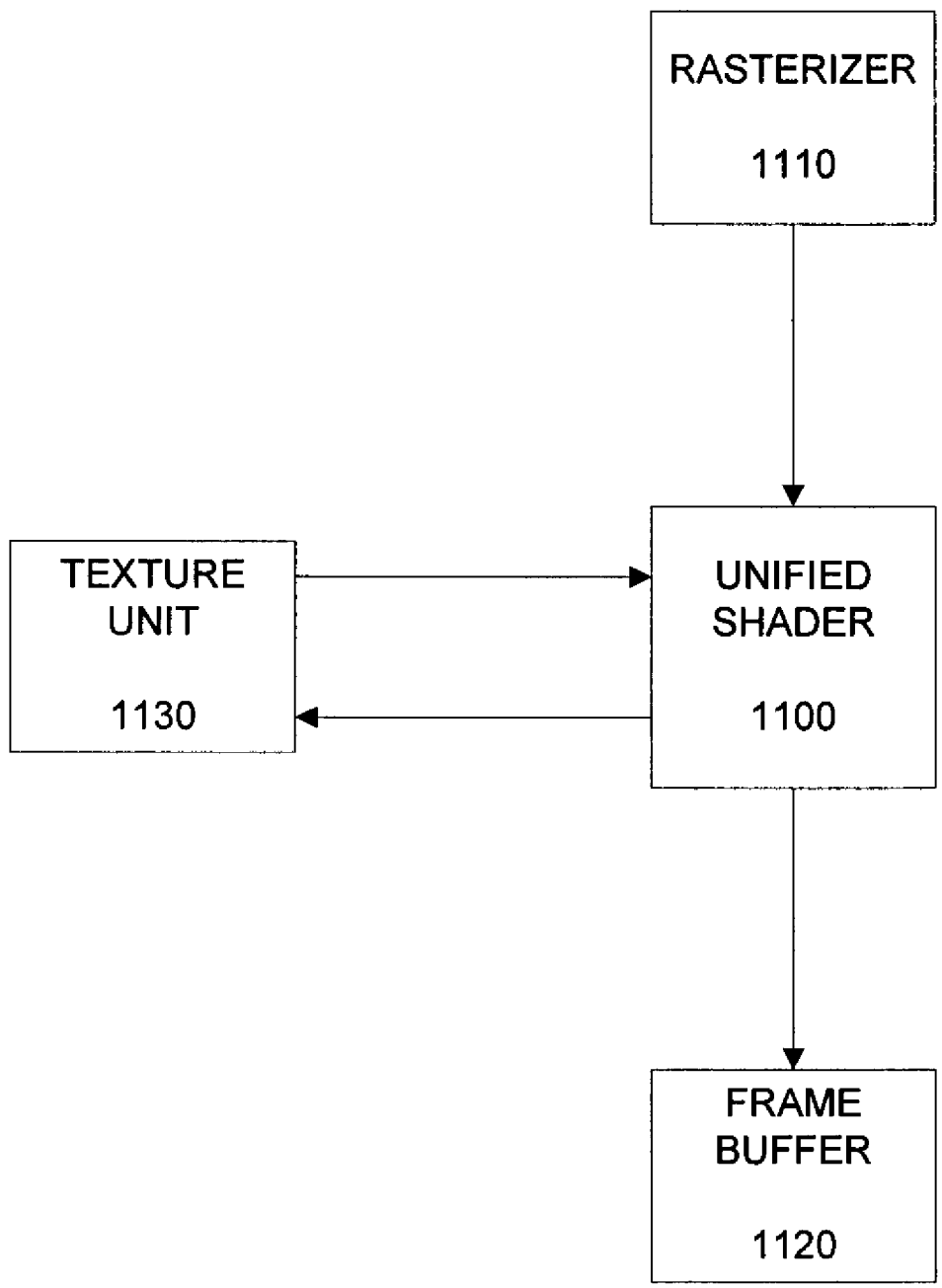
FIG. 9 is a block diagram of a unified shader according to an embodiment of the present invention.

One embodiment of a unified shader is shown in the block diagram of FIG. 9. Unified shader 1100 performs per-pixel shading calculations on rasterized values that are passed from a rasterizer unit 1110. The results of the calculations are sent to frame buffer 1120. As part of the calculation performed by unified shader 1100, a texture unit 1130 may receive texture lookup requests from the shader 1100. The actual shading algorithm used may vary and may be defined by a set of instructions, such as microcode instructions.

Unified (Pixel) Shader Architecture

Figure 10:
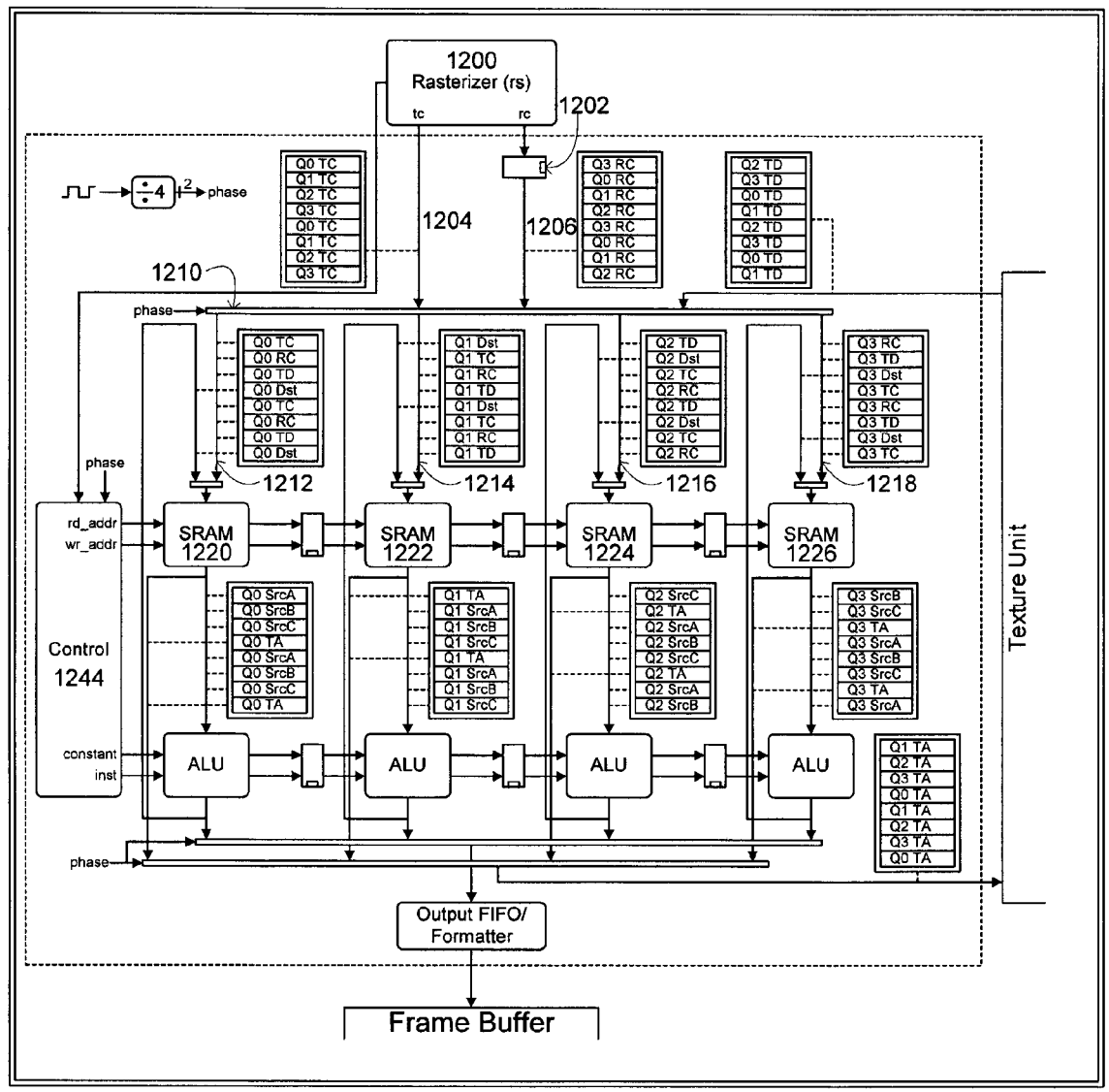
FIG. 10 shows a unified shader architecture according to an embodiment of the present invention.

FIG. 10 is a block diagram of a Unified Shader according to an embodiment of the present invention. The rasterizer 1200 generates a texture address (tc) and rasterization color (rc) in any suitable format and order at a rate of one pixel quad (a quad is a 2×2 tile of pixels) every clock. The rasterization color is delayed by one clock at delay 1202 to provide correct interleaving for the rest of the design. Buses 1204 and 1206 then pass the packet through a 4-way crossbar 1210 programmed to rotate one slot each clock over a 4-clock cycle. The result is that output 0 (1212) of the crossbar (1210) contains exclusively Quad 0 data, output 1 (1214) contains Quad 1 data, output 2 (1216) contains Quad 2 data, and output 3 (1218) contains Quad 3 data.

Four identical SRAM/ALU pairs 1220, 1222, 1224, and 1226 process the data. SRAM space is allocated as each quad is received from the rasterizer. This space is used to store input values and intermediate variables needed by the shader program. This space remains allocated for the time it takes to completely process the quad. Sufficient storage is available such that multiple quads can reside in the shader at the same time at different stages of completion. Though SRAM is used in one embodiment, it can be appreciated that other types of equivalent physical memory implementation can be used as well.

Each SRAM/ALU performs the following operations in one 4-clock cycle:
1. Writes one rasterizer texture address to the SRAM.
2. Writes one rasterizer color value to the SRAM.
3. Reads up to three source operands from the SRAM and executes one shader instruction.
4. Writes the result from the ($2^{nd}$ previous) shader instruction back to the SRAM.
5. Reads one texture address from the SRAM and issues it to the texture unit.
6. Writes one return texture value to the SRAM.

Due to the time skewing of each SRAM/ALU paid relative to the previous one, it is possible to use a simple mux to multiplex the texture requests from the four SRAM/ALU pairs into a single stream containing one texture request every clock. The resulting texture data is de-multiplexed and written back into the SRAM's. A control logic block 1244 generates the SRAM read and write addresses, and issues the ALU instructions for the first SRAM and ALU 1220. Each successive SRAM and ALU receives the same addresses and instruction delayed by one clock from the previous one. This enables the addresses and instructions to be lined up with the time-skewed data.

Each SRAM operates within a 4-clock cycle, allowing a single read/write physical SRAM to support four reads and four writes during a given cycle. This design traditionally would have required multi-ported RAM's or register files. The use for each read and write slot within the 4-clock cycle is defined in table 1.

TABLE 1

|  | write_data[ ] | read_data[ ] |
| --- | --- | --- |
| Clock 0 | Rasterized Texture Address (tc) | ALU Source Operand A |
| Clock 1 | Rasterized Color (rc) | ALU Source Operand B |
| Clock 2 | Texture Unit Data (td) | ALU Source Operand C |
| Clock 3 | ALU Destination | Texture Unit Address (ta) |

Shader Code Partitioning

The first step in programming the unified shader of the present invention is partitioning the shader code. This ensures that all ALU and texture instructions pertaining to a given level of indirection are grouped together. The reason for this is that texture operations within the same level are effectively executed in parallel, and so it is important that there be no cross-dependencies.

In one embodiment, indirection levels are numbered starting with 0 at the top of the code, and increasing by 1 for each pass through the texture system. An indirection level of 0 means that all ALU operands or texture addresses are derived directly from the input data (rasterized color and texture addresses). An indirection level of 1 means that all ALU operands or texture addresses are dependent on the result from a single pass through the texture system. An indirection level of 2 means that all ALU operands or texture addresses are dependent on the result from two passes through the texture system.

Figure 11:
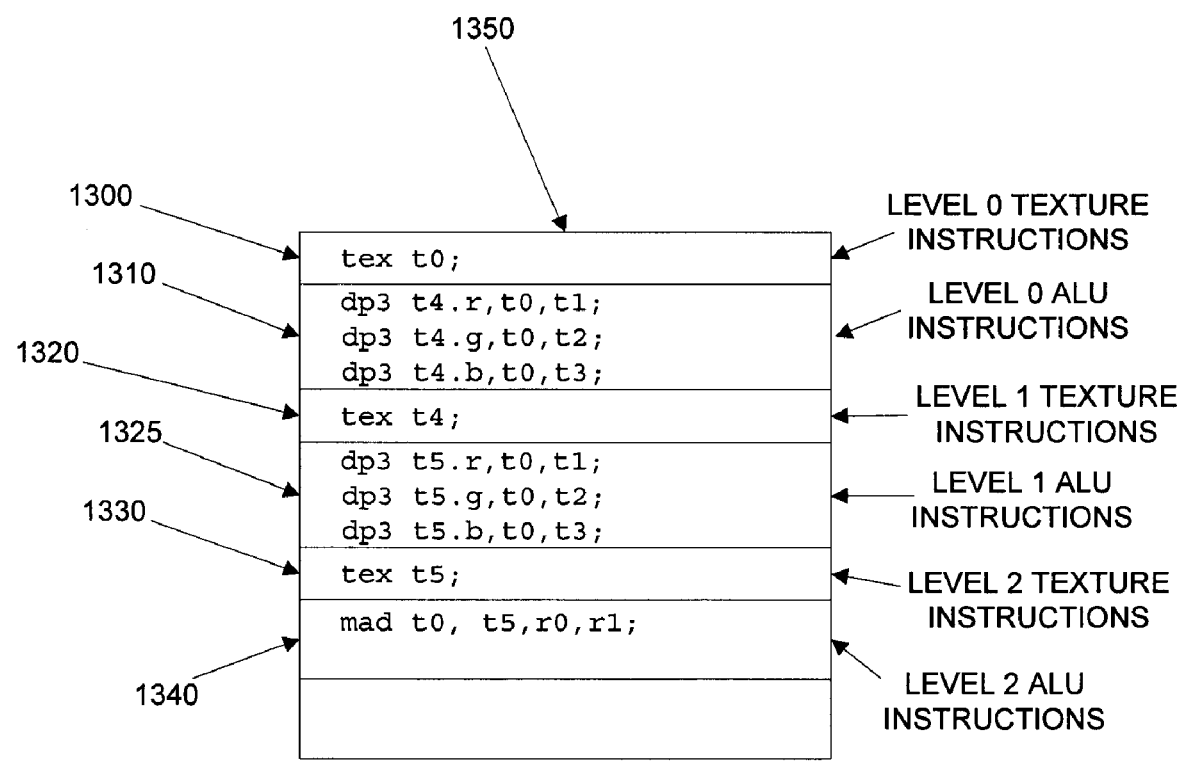
FIG. 11 shows how shader code is partitioned according to an embodiment of the present invention.

FIG. 11 shows an example shader code, together with its corresponding partitioning. Shader code 1350 includes code for level 0 texture instructions 1300, level 0 ALU instructions 1310, level 1 texture instructions 1320, level 1 ALU instructions 1325, level 2 texture instructions 1330, and level 2 ALU instructions 1340.

Control Logic

Figure 12:
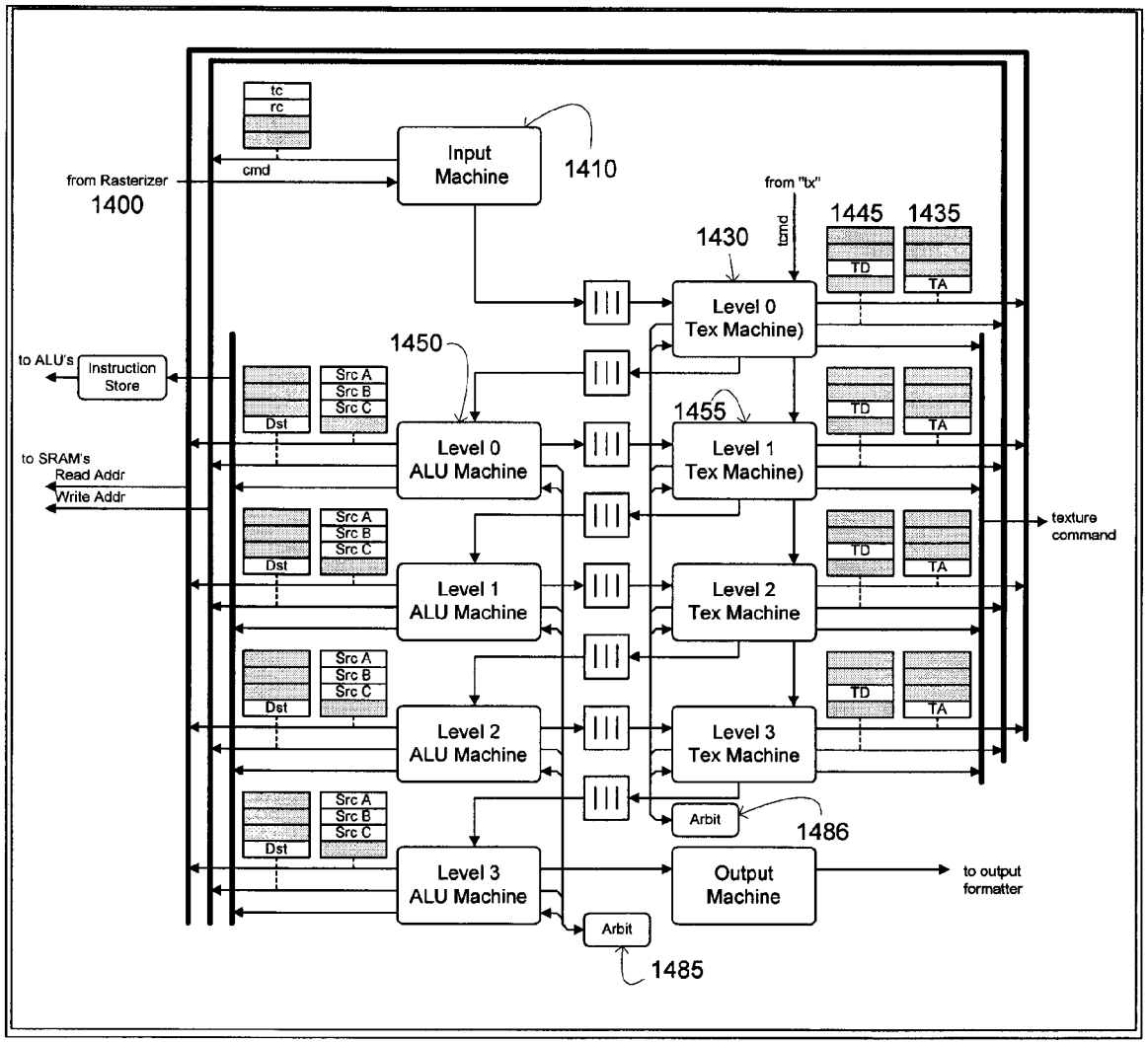
FIG. 12 shows how control logic is used according to an embodiment of the present invention.

The control logic for the Unified Pixel Shader of one embodiment of the present invention comprises a number of state machines connected serially by a set of small FIFO's. As data for each block of pixels is received from the rasterizer, a "control token" is generated. The control token contains a small amount of information describing this block of pixels. The control token is passed serially between state machines to indicate who has control over this block of data. Once the control token has reached the last state machine in the chain and the final processed data has been output, the control token is discarded. For a 4-level system, 10 state machines are required. This embodiment's control logic is shown in FIG. 12.

Rasterizer 1400 generates packets of data containing information for a block of 16 pixels (4 quads). Each pixel contains one or more sets of texture coordinates (texture addresses), and one or more color values. The time needed to transfer this packet is dependent on the number of texture coordinates and colors.

The input state machine 1410 receives notification that a packet of data is being received. The input state machine then allocates storage space (for storing input and temporary values) for the block of 16 pixels—each of the four SRAM's will own 4 pixels. The input state machine then instructs the SRAMS's to write the (one or more) sets of texture coordinates and color data to the correct locations within this recently allocated storage space. Upon completion, the input state machine generates a control token for this block of data, and passes it to the level 0 Texture machine 1430.

The level 0 texture machine 1430 implements the level 0 Texture sequence as shown in FIG. 11 (1300). Upon receipt of a control token, this state machine executes each instruction in the sequence, applying the operation to all 16 pixels within the block associated with this control token. For each instruction in this sequence, the level 0 Texture machine instructs the SRAM's to read a set of texture coordinates, and then issues commands to the texture unit to perform a lookup on these texture coordinates. As data is returned from the texture unit, it gets written into the SRAM's at the appropriate location. Upon receipt of the return data for the last instruction in the level 0 texture sequence, the level 0 texture machine passes the control token to the level 0 ALU machine 1450.

The level 0 ALU machine 1450 implements the level 0 ALU sequence as shown in FIG. 11 (1310). Upon receipt of a control token, this state machine executes each instruction in the sequence, applying the operation to all 16 pixels within the block associated with this control token. For each instruction in this sequence, the level 0 ALU machine instructs the SRAM's to read the source data for this instruction, then instructs the ALU to perform the appropriate operation on the data (ADD, MUL, etc.), and then instructs the SRAM's to write the result. Upon completion of the level 0 ALU sequence, the level 0 ALU machine passes the control token to the level 1 texture machine 1455.

The level 1 texture machine 1455 operates in the same way as the level 0 texture machine 1430, passing the control token to the level 1 ALU machine on completion of its section of code. Thus the control token propagates through all 10 machines. Eventually, the command reaches the output state machine. The output state machine instructs the output formatter to pull data from the output FIFO, which is then reformatted and sent out of the Unified Shader to the frame buffer. Following this, the control token is discarded and the storage space for the block of data is deallocated.

Only one ALU state machine may have access to the SRAM address bus or the instruction decode bus at one time. Similarly, only one texture state machine may have access to the SRAM address bus at one time. Arbitration is performed by two arbiter blocks 1485 and 1486 (one for the ALU state machines and one for the Texture state machines). The arbiters always favor the higher level state machine, preventing half-finished jobs from clogging up the SRAM's.

Different controls token may be resident in the different parts of the control pipelines at the same time, providing an efficient way of hiding latency through the texture unit and maximizing usage of the ALU and the texture units. As an example, the texture unit may be working on a given block while at the same time the ALU may be working on an earlier block.

A comparison of the allocation address pointer for the input state machine, and the deallocation pointer in the output state machine in the chain, gives an indication of how much unallocated SRAM memory is available. When this number falls below a preset mark, the input state machine will stall the rasterizer preventing any new input data.

Where the number of levels of indirection is less than four, certain state machines will go into "pass-through" mode where they immediately copy the control token from the input to the output without performing any work or waiting for arbitration.

Register Subsystem

Figure 13:
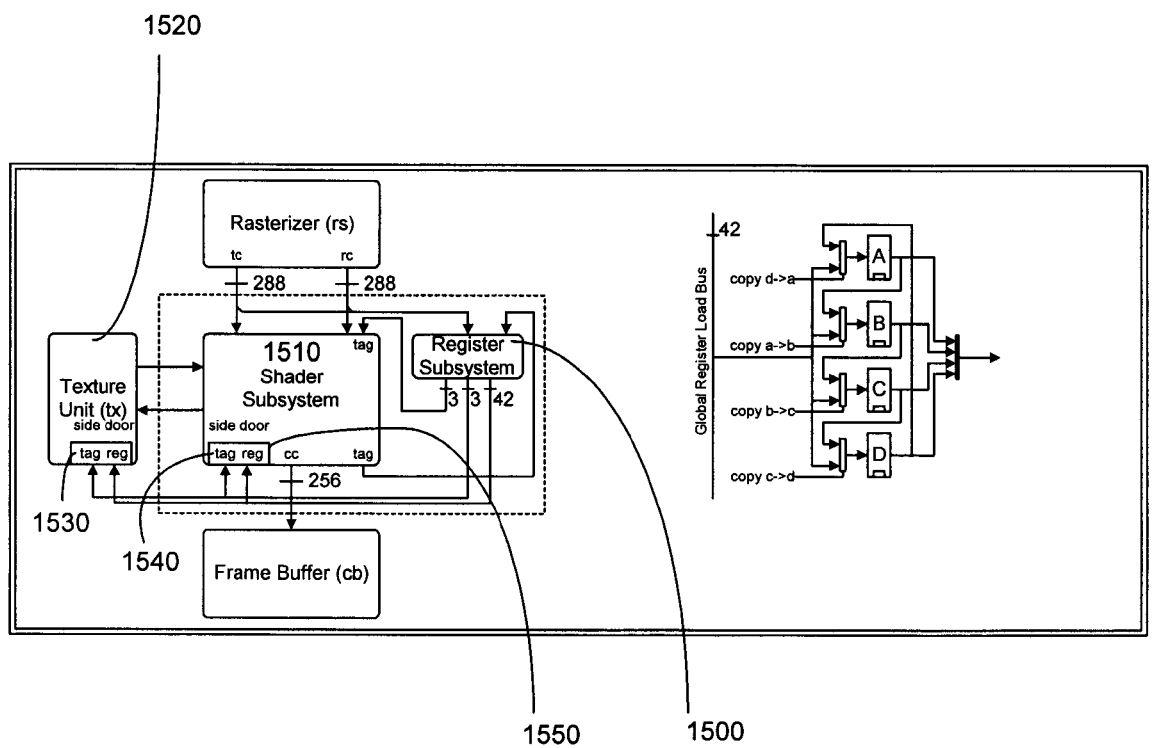
FIG. 13 shows a register subsystem according to an embodiment of the present invention.

Due to the out-of-order processing of data by the texture unit, ALU, and control logic, the normal trickle-down method of loading registers will not work without a complex system of partial flushes that will seriously compromise performance. For this reason, a new register subsystem is used in one embodiment of the present invention and is shown in FIG. 13. All registers 1500 within the unified shader subsystem 1510 (including those owned by the texture system 1520) are quad or double buffered. The quad-buffered register sets are labeled "A", "B", "C", and "D". The double-buffered register sets are labeled "E", and "F". Register loading happens through side doors 1530 and 1540 and takes effect immediately. A tag 1550 attached to the data within the shader specifies which register set to use. Global commands allow the immediate copying of an entire register set. Typically, those registers expected to change often (such as PP_TXFILTER0) are quad-buffered. Those registers expected to change infrequently (such as PP_TXFILTER1) are double-buffered.

On reset, the default quad-buffering tag is set to "A" and the default double-buffered tag is set to "E". The default tag specifies where mode change registers are written, as well as how subsequent pixel quads are tagged. At the start of the second mode change, a global command is issued to copy register sets "A" to "B" and the default quad-buffered tag is switched to "B". If the mode change affects double buffered registers, an additional global command is issued to copy register sets "E" to "F" and the default double buffered-tag is switched to F. This continues in rotation with successive mode changes and pixel quads using register sets "C", "D", "A", "B", etc. for quad buffered registers, and "E", "F", "E", "F", etc. for double buffered registers.

Prior to issuing a copy command, a check is made of the tag attached to the last pixel quad to leave the shader. If this is equal to the destination register set specified in the copy command, the pipeline is stalled until the situation is rectified. As an example, to copy register set "C" to "D", one must first look at the data leaving the shader. If this is tagged to use register set "C", one knows that it cannot be removed from register set "C" without causing an error. Once the tag associated with the data leaving the shader changes to "D", one can then safely remove the data in "C", and resume operation.

Multiple Shaders

Figure 14:
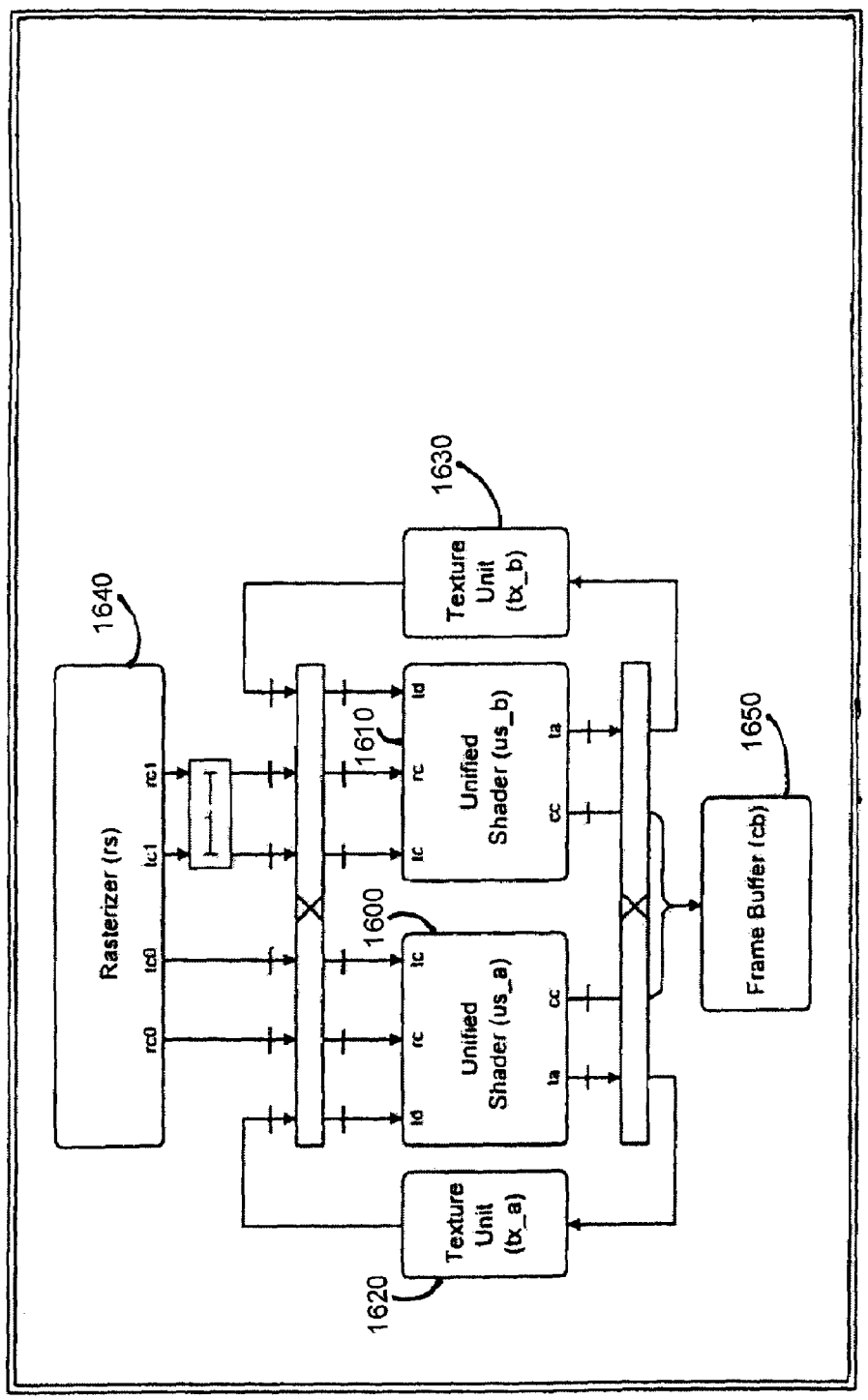
FIG. 14 shows a multiple shader system according to an embodiment of the present invention.

Multiple unified shaders may be connected (along with a minimum amount of routing and glue logic), to support multiple ALU operations per pixel per clock and multiple independent texture lookups per clock. One embodiment using multiple shaders is shown in FIG. 14. In this embodiment two unified shaders 1600 and 1610 support two ALU operations per pixel per clock and two independent texture lookups per clock using texture units 1620 and 1630.

Such a system may be partially disabled (under software control), to allow a fall back to 1 ALU operation per pixel per clock, and 1 texture unit. In the case where the system is partially disabled, the user may choose which of the two unified shaders and which of the two texture units to disable. The system of FIG. 14 operates on an 8-clock cycle made up from two 4-clock cycles labeled "a" and "b". Each shader 1600 and 1610 operates on a 4-clock cycle, however it can be programmed to issue requests for odd textures during one cycle type ("a" or "b") and even textures during the other cycle type.

The rasterizer 1640 outputs two texture addresses and two colors per pixel per clock. Eight quads are rasterized together, with the rasterizer outputting the first set of texture address and color for all eight quads before moving on to the next set. During the "a" cycle, four sets of even texture addresses and colors are passed from the rasterizer to Unified Shader 1600 (us_a). During the "b" cycle, the crossbar 1650 between the rasterizer and shaders is configured to "swap", and the next four sets of even texture addresses and colors are passed to unified shader 1610 (us_b). Simultaneously, the first four sets of odd texture addresses and colors are passed to unified shader 1600 (us_a) after having been delayed by 4 clocks. Thus "us_a" ends up operating on quads 0-3, 8-11, 16-19, etc. and "us_b" ends up operating on quads 4-7, 12-15, 20-23, etc.

When a request for texture owned by the "tx_a" texture unit 1620 is called for, this is issued by "us_a" during the "a" cycle for the first set of 4 quads, and by "us_b" during the "b" cycle for the second set of 4 quads. Similarly, when a request for a texture owned by the "tx_b" texture unit 1630 is called for, this is issued by "us_a" during the "b" cycle for the first set of quads, and by "us_b" during the "a" cycle for the second set of quads. Since each crossbar is programmed to swap only during the "b" cycle, this ensures that texture units "tx_a" and "tx_b" only process requests for textures which they own. The assignment of textures to the "tx_a" and "tx_b" texture units is done at compile time.

Since shader "us_b" always operates exactly four clocks later than "us_a", the output data starts coming out of "us_a" for 4 clocks followed by "us_b" for 4 clocks. The outputs are "or'd" together to get a continuous "in order" output stream going to the frame buffer 1650. The only modification to the unified shader architecture needed to support an 8-ALU, 2-texture system, is the ability to conditionally issue and receive texture requests during a specific cycle. This requires a small amount of additional complexity to the texture state machine in the control logic. Reverting back to a 4-ALU, 1-texture system involves (a) reconfiguring the crossbars, (b) turning off the conditional texture feature in the unified shaders, and (c) reconfiguring the rasterizer to generate all texture addresses and colors from the tc0 and rc0 ports over a 4-quad cycle.

ALU I/O Description

Figure 15:
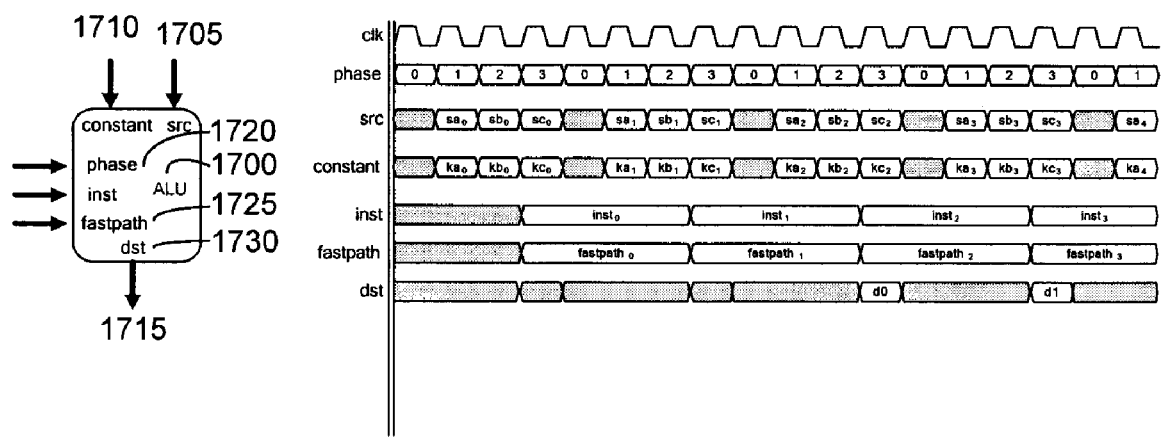
FIG. 15 shows an ALU according to an embodiment of the present invention.

Each ALU processes one pixel quad (4 pixels) each 4-clock cycle. An example of one embodiment of an ALU is shown in FIG. 15. Data is passed to the ALU 1700 over an input bus (src) 1705 and a constant bus (constant) 1710. Data is passed out of the ALU over a single output bus (dst) 1715. Three additional buses, phase 1720, inst 1725, and fastpath 1730 control the operation of the ALU. No flow control is needed for this ALU, and there is no mechanism for stalling the data. Once a pixel quad has been submitted, the receiver is guaranteed to be able to accept the result after the designated number of clocks.

Even though the result from the ALU operation appears 10 clocks after the instruction is issued, internally the ALU must have a 4-clock latency. The cases where one or more of the source operands are equal to result from the previous of $2^{nd}$ previous ALU operation, are handled internally by a fast path, and are controlled by the "fastpath" instruction.

Thus, a unified shader is described in conjunction with one or more specific embodiments.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives and servers on a network.

The computer systems described above are for example only. An embodiment of the invention may be implemented in any type of computer system or programming or processing environment.

A parallel pipeline graphics system is described in conjunction with one or more specific embodiments. The invention is defined by the claims and their full scope of equivalents.

What is claimed is:

1. A graphics chip comprising:
  a front-end in the graphics chip configured to receive one or more graphics instructions and to output a geometry;
  a back-end in the graphics chip configured to receive said geometry and to process said geometry into one or more final pixels to be placed in a frame buffer;
  wherein said back-end in the graphics chip comprises multiple parallel pipelines;
  wherein said geometry is determined to locate in a portion of an output screen defined by a tile; and
  wherein each of said parallel pipelines further comprises a unified shader that is programmable to perform both color shading and texture shading.

2. The graphics chip of claim 1 wherein each of said parallel pipelines further comprises:
  a FIFO unit for load balancing said each of said pipelines.

3. The graphics chip of claim 1 wherein each of said parallel pipelines further comprises:
  a z buffer logic unit; and
  a color buffer logic unit.

4. The graphics chip of claim 3 wherein said z buffer logic unit interfaces with said scan converter through a hierarchical Z interface and an early Z interface.

5. The graphics chip of claim 3 wherein said z buffer logic unit interfaces with said unified shader through a late Z interface.

6. The graphic chip of claim 1 comprising a setup unit for directing said geometry into one of said multiple parallel pipelines wherein said geometry is determined to locate in a portion of an output screen defined by a tile.

7. The graphics chip of claim 1 wherein each pipeline further comprises:
  a scan converter;
  a rasterizer; and
  a texture unit.

8. The graphics chip of claim 1 wherein the unified shader is operative to operative to apply a programmed sequence of instructions to rasterized values and is operative to loop back to process operations for color shading and/or texture address shading.

9. The graphics chip of claim 1 wherein the unified shader is operative to apply a programmed sequence of instructions such that a first set of instructions are executed to perform color shading and a second set of instructions are executed to perform texture shading.

10. A method for processing computer graphics comprising:
- receiving one or more graphics instructions in a front-end of a graphics chip and outputting a geometry;
- receiving said geometry in a back-end of the graphics chip;
- processing said geometry into one or more final pixels to be placed in a frame buffer,
- wherein said back-end comprises multiple parallel pipelines;
- using a setup unit to direct said geometry into one of said multiple parallel pipelines;
- wherein said geometry is determined to locate in a portion of an output screen defined by a tile; and
- wherein each of said parallel pipelines further comprises a unified shader and where the unified shader performs both color shading and texture shading based on programmable instructions.

11. The method of claim 10 further comprising:
using a FIFO unit for load balancing each of said pipelines.

12. The method of claim 10 wherein each of said parallel pipelines further comprises:
- a z buffer logic unit; and
- a color buffer logic unit.

13. The method of claim 12 wherein said z buffer logic unit interfaces with said scan converter through a hierarchical Z interface and an early Z interface.

14. The method of claim 12 wherein said z buffer logic unit interfaces with said unified shader through a late Z interface.

15. The method of claim 10 wherein the unified shader applies a programmed sequence of instructions to rasterized values and loops back to process operations for color shading and/or texture address shading.

16. The method of claim 10 wherein the unified shader applies a programmed sequence of instructions such that a first set of instructions are executed to perform color shading and a second set of instructions are executed to perform texture shading.

17. A computer program product comprising:
- a computer usable medium having computer readable program code embodied therein configured to process computer graphics, said computer program product comprising:
- computer readable code configured to cause a computer to receive one or more graphics instructions in a front-end of a graphics chip and output a geometry;
- computer readable code configured to cause a computer to receive said geometry in a back-end of a graphics chip;
- computer readable code configured to cause a computer to process said geometry into one or more final pixels to be placed in a frame buffer,
- wherein said back-end comprises multiple parallel pipelines;
- computer readable code configured to use a setup unit to direct said geometry into one of said multiple parallel pipelines;
- wherein said geometry is determined to locate in a portion of an output screen defined by a tile; and
- wherein each of said parallel pipelines further comprises a unified shader that is programmable to perform both color shading and texture shading.

18. The computer program product of claim 17 wherein said computer readable code configured to cause a computer to process further comprises:
computer readable code configured to cause a computer to use a FIFO unit for load balancing each of said pipelines.

19. The computer program product of claim 17 wherein each of said parallel pipelines further comprises:
- a z buffer logic unit; and
- a color buffer logic unit.

20. The computer program product of claim 19 wherein said z buffer logic unit interfaces with said scan converter through a hierarchical Z interface and an early Z interface.

21. The computer program product of claim 19 wherein said z buffer logic unit interfaces with said unified shader through a late Z interface.

* * * * *

UNITED STATES PATENT AND TRADEMARK OFFICE
CERTIFICATE OF CORRECTION

PATENT NO. : 7,633,506 B1  Page 1 of 1
APPLICATION NO. : 10/724384
DATED : December 15, 2009
INVENTOR(S) : Leather et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 919 days.

Signed and Sealed this

Twenty-first Day of December, 2010

David J. Kappos
*Director of the United States Patent and Trademark Office*

UNITED STATES PATENT AND TRADEMARK OFFICE
CERTIFICATE OF CORRECTION

PATENT NO. : 7,633,506 B1
APPLICATION NO. : 10/724384
DATED : December 15, 2009
INVENTOR(S) : Mark M. Leather and Eric Demers Page 1 of 1

It is certified that error appears in the above-identified patent and that said Letters Patent is hereby corrected as shown below:

In the specification

Column 6, line 36, after "2003," please insert --which is a continuation of U.S. patent application entitled "Method and Apparatus for Rasterizer Interpolation", having inventor Mark M. Leather, with Ser. No. 10/716,590, filed Nov. 18, 2003, which claims priority from provisional application entitled "Method and Apparatus for Rasterizer Interpolation", having inventor Mark M. Leather, with Ser. No. 60/427,260, filed Nov. 18, 2002,--.

Column 6, line 63, after "2003," please insert --which is a continuation of U.S. patent application entitled "Unified Shader", having inventors Mark M. Leather et al., with Ser. No. 10/716,946, filed Nov. 18, 2003, which claims priority from provisional application entitled "Unified Shader", having inventors Mark M. Leather et al., with Ser. No. 60/427,338, filed Nov. 18, 2002,--.

Signed and Sealed this
Thirty-first Day of May, 2016

Michelle K. Lee
*Director of the United States Patent and Trademark Office*